United States Patent [19]

Okumura et al.

[11] Patent Number: 5,191,040

[45] Date of Patent: Mar. 2, 1993

[54] PROCESS FOR PRODUCING STYRENIC POLYMER

[75] Inventors: Ryozo Okumura; Kiichi Izumida, both of Ichihara, Japan

[73] Assignee: Idemitsu Petrochemical Co., Ltd., Tokyo, Japan

[21] Appl. No.: 833,506

[22] Filed: Feb. 11, 1992

[30] Foreign Application Priority Data

Feb. 27, 1991 [JP] Japan .................. 3-053750

[51] Int. Cl.$^5$ .................. C08F 4/36; C08F 2/02
[52] U.S. Cl. .................. 526/65; 526/88; 526/232.3; 526/293; 526/346
[58] Field of Search .................. 526/232, 346, 65, 88, 526/232.3, 228, 293

[56] References Cited

U.S. PATENT DOCUMENTS

| | | | |
|---|---|---|---|
| 3,357,964 | 12/1967 | Gulpen et al. | 526/346 X |
| 3,639,372 | 2/1972 | Haynes, Jr. et al. | 526/65 |
| 3,859,268 | 1/1975 | Novack et al. | 526/65 |
| 4,042,768 | 8/1977 | Müller et al. | 526/65 |

FOREIGN PATENT DOCUMENTS

| | | |
|---|---|---|
| 0351929 | 1/1990 | European Pat. Off. . |
| 41-19511 | 11/1966 | Japan . |
| 64-70507 | 3/1989 | Japan . |
| 2-170806 | 7/1990 | Japan . |
| 444488 | 2/1968 | Switzerland . |

Primary Examiner—Fred Teskin
Attorney, Agent, or Firm—Frishauf, Holtz, Goodman & Woodward

[57] ABSTRACT

A process for producing a styrenic polymer suitable for making molded products which has excellent quality without a decrease in the productivity. The process comprises feeding a compound consisting essentially of a styrenic monomer to 2 to 6 units of reactors connected in series and carrying out a bulk polymerization at a reaction temperature of 90° to 200° C. and a difference of reaction temperatures among the units of reactors of not more than 40° C. and in the presence of 10 to 450 ppm by weight of an organic peroxide represented by the following formula (I):

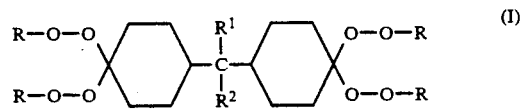

wherein R represents a tertiary alkyl group or a tertiary aralkyl group, and $R^1$ and $R^2$ each represent an alkyl group having 1 to 2 carbon atoms, the styrenic polymer having a weight average molecular weight of $30 \times 10^4$ to $70 \times 10^4$ and a ratio of weight average molecular weight (Mw) to number average molecular weight (Mn) of not more than 3.0.

14 Claims, No Drawings

PROCESS FOR PRODUCING STYRENIC POLYMER

BACKGROUND OF THE INVENTION

1. Field of the Invention

The present invention relates to a process for producing a styrenic polymer and more particularly, to a process for producing styrenic polymers without reducing their effectiveness as a molding material suitable for molded products which have excellent quality.

2. Description of the Related Arts

Various types of high-molecular weight polystyrenes have been produced for increasing the strength of polystyrene. However, attempts to elevate molecular weight of polystyrene have been disturbed by the need for retarding the reaction rate, with the result that the productivity is extremely reduced.

There have been proposed methods of solving this technical difficulty by using organic peroxides or multifunctional compounds or special reactors, wherein these methods have the defects that the reaction rate is not adequately raised and that the polystyrene produced therefrom has not had acceptable quality. A method for producing high-molecular weight polystyrene of good quality without a decrease of the productivity have not been made available yet.

For example, in Japanese Patent Publication 19511/1966 a technique of producing polystyrene by using a particular organic peroxide has been disclosed but has a shortcoming that too much organic peroxide is needed and that polystyrene has a low molecular weight, showing a low impact resistance. Japanese Patent Application Laid Open 170806/1990 discloses a method of producing a styrenic polymer with elevated impact resistance and an improved molecular weight distribution by carrying out the polymerization in the presence of a multifunctional vinyl compound, wherein this method has a defect that molded products made therefrom do not have a satisfactory degree of haze.

Further, although a method for producing styrenic resin with high molecular weight by using special reactors according to the continuous bulk polymerization method has been described in Japanese Patent Application Laid Open 70507/1989, the method has a problem of an insufficient increase of the reaction rate.

Thus, those skilled in the art have been seeking a method for producing styrenic polymers with a high molecular weight which are useful as a raw material of molded products excellent in the degree of haze and impact resistance.

The present inventors have made intensive studies in order to develop a process for producing the styrenic polymer from the above-mentioned viewpoint.

As the result, it has been found that above-mentioned objects can be achieved by polymerizing a compound consisting essentially of a styrenic monomer (aromatic vinyl monomer) in the presence of 10 to 500 ppm by weight of a particular organic peroxide. The present invention has been completed on the basis of this finding.

SUMMARY OF THE INVENTION

Therefore, an object of the present invention is to provide a process for producing a styrenic polymer have desirable properties as a molding material suitable for molded products which have excellent quality.

Another object of the present invention is to provide a styrenic polymer as a molding material suitable for making molded products having excellent quality, a high impact resistance and a satisfactory degree of haze.

Still another object of the present invention is to provide a styrenic polymer as a molding material suitable for use in the fields of household goods, electric appliances and the like.

The present invention provides a process for producing a styrenic polymer which comprises polymerizing a compound consisting essentially of a styrenic monomer in the presence of 10 to 500 ppm by weight of an organic peroxide represented by the following general formula (I):

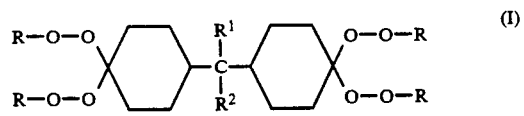

wherein R represents a tertiary alkyl group or a tertiary aralkyl group, and $R^1$ and $R^2$ each represent an alkyl group having 1 to 2 carbon atoms, said styrenic polymer having weight average molecular weight of $30 \times 10^4$ to $70 \times 10^4$ and a ratio of weight average molecular weight (Mw) to number average molecular weight (Mn) of not more than 3.0 (Mw/Mn).

DESCRIPTION OF THE PREFERRED EMBODIMENTS

Styrenic monomers (that is, aromatic vinyl monomers) used in the present invention include styrene, α-substituted alkylstyrene such as α-methylstyrene, α-ethylstyrene and α-isopropylstyrene, nucleus substituted alkylstyrene such as p-methylstyrene, m-methylstyrene and 2,5-dimethylstyrene, nucleus substituted-halogenated styrene such as p-chlorostyrene, p-bromostryrene and dibromostyrene or a mixture thereof.

According to the present invention, above-mentioned styrenic monomers can be used as the starting material singly or in combination with other compounds (monomers) which are copolymerizable therewith. Examples of these monomers (comonomers) include acrylic monomers such as acrylonitrile, methacrylonitrile, methacrylic acid, methyl methacrylate, acrylic acid and methyl acrylate and further maleimide, phenylmaleimide and nucleus substituted phenylmaleimide.

Therefore, styrenic polymers according to the present invention include not only homopolymers and copolymers (random, graft and the like) of styrenic monomer selected from said styrene and substituted styrene but also copolymers of this styrenic monomer with above-mentioned other types of monomers which are copolymerizable therewith.

Organic peroxides to be used in the present invention are those represented by the general formula (I). Therein, R represents a tertiary alkyl group (that is, tertiary butyl group, tertiary amyl group, tertiary octyl group and the like) or a tertiary aralkyl group (cumyl group, 1-ethyl-1-phenylpropyl group and the like), and $R^1$ and $R^2$ each represent an alkyl group having 1 to 2 carbon atoms (that is, methyl group or ethyl group). Specific examples of these organic peroxides include 2,2-bis(4,4-ditertiarybutylperoxycyclohexyl) propane; 2,2-bis(4,4-ditertiaryamylperoxycyclohexyl) propane; 2,2-bis(4,4-dicumylperoxycyclohexyl) propane; and 2,2-bis(4,4-ditertiarybutylperoxycyclohexyl) butane.

Among them, 2,2-bis(4,4-ditertiarybutylperoxycyclohexyl) propane is preferred. A mixture of these organic peroxides is used as well. The amount of the organic peroxides added is 10 to 500 ppm by weight, preferably 100 to 450 ppm by weight based on styrenic monomers. When the amount of the organic peroxide is less than 10 ppm by weight, their presence is not substantially effective. When the amount of the organic peroxide added is more than 500 ppm by weight, the polymers obtained have lower molecular weight.

The organic peroxides are incorporated into the reaction system by a variety of means, the methods thereof are not otherwise limited and usually the following methods are adopted: their amount is fed either as a whole in the initial stage of the polymerization or in two divided lots in the initial and midway stage of the polymerization.

The method of the present invention is carried out by the use of above-mentioned organic peroxides and, if necessary, usual polymerization initiators may be used in combination. These polymerization initiators include organic peroxides such as tertiarybutylhydroperoxide; ditertiarybutylperoxide; cumene hydroperoxide; dicumylperoxide; benzoylperoxide; 1,1-bis(tertiarybutylperoxy)cyclohexane; and 1,1-bis(tertiarybutylperoxy)-3,3,5-trimethylcyclohexane, and azo compounds such as azo bisisobutyronitrile; azobis-2,4-dimethylvaleronitrile; azobiscyclohexanecarbonitrile; azobismethyl isolactate; and azobiscyano valerate. Further, other polymerization initiators may as well be used. These polymerization initiators are used either singly or in combination in consideration of existing conditions.

The polymerization according to the present invention usually is the continuous bulk polymerization, but includes the batch polymerization.

The continuous bulk polymerization is carried out in a following way: the monomers (styrenic monomers) are fed into a system consisting of 2 to 6 units of full mixing flow type and/or plug flow type reactors and one or more units of monomer devolatilizing equipments which are connected in series. The reaction temperatures are preferably 90° to 200° C. Further, the reaction temperature difference among the reactors should be preferably not higher than 40° C. As described above, the amount of organic peroxides represented by the general formula (I) is incorporated either as a whole in the initial stage of the polymerization or as divided lots in the initial and midway stage of the polymerization. A small amount of solvent such as ethylbenzene and xylene may as well be added to the reaction system. The reaction rate r is not otherwise limited, is selected suitably in consideration of existing conditions and preferably in a range of 5 to 15%/hr. If weight average molecular weight at the outlet of the last reactor is expressed as MwO, $MwO \geq (75 - 3 \times r) \times 10^4$ is particularly preferred from the viewpoint of the productivity. Further, the conversion of a styrenic monomer at the last reactor is preferably 40 to 90% by weight.

Discharged out of the last reactor, polymers (styrenic polymers) are fed into monomer devolatilizing equipments to remove residual monomers and finally pelletized. Examples of monomer devolatilizing equipment include a thin film type evaporator and a flush drum, and the equipment is operated, for example under the conditions of temperature of 180° to 300° C. and of pressure of 1 to 600 Torr. Residual monomers are discharged from the outlet of devolatilizing equipment usually in an amount of not more than 5000 ppm by weight, preferably not more than 1000 ppm by weight and more preferably not more than 500 ppm by weight. Additives such as an antioxidant, an inner lubricating agent, an outer lubricating agent, a mold releasing agent, a weather resistant agent, a flame retardant and a colorant may be added to polymers when they are pelletized.

In batch bulk polymerization, the similar process as that of the above continuous bulk polymerization is conducted.

According to the present invention, styrenic polymers having a weight average molecular weight (Mw) of $30 \times 10^4$ to $70 \times 10^4$, preferably $30 \times 10^4$ to $60 \times 10^4$ and a ratio of weight average molecular weight (Mw) to number average molecular weight (Mn) of not more than 3.0, preferably 2.0 to 3.0 (Mw/Mn) (measured with gel permeation chromatography) are obtained by varying the polymerizing conditions including the amount of organic peroxides represented by the general formula (I), the reaction temperatures among the reactors of the multi-stage continuous polymerization (or the batch polymerization) and the like.

When styrenic polymers have a weight average molecular weight of less than $30 \times 10^4$, the molded products made therefrom have an insufficient impact resistance. When styrenic polymers have a weight average molecular weight of more than $70 \times 10^4$, the degree of haze of molded products is deteriorated.

Further, styrenic polymers according to the present invention must have the ratio of weight average molecular weight (Mw) to number average molecular weight (Mn), that is, Mw/Mn ratio of not more than 3.0, preferably 2.0 to 3.0. When the Mw/Mn ratio exceeds 3.0, the degree of haze deteriorates so that the object of the present invention is not achieved.

According to the present invention, high-molecular styrenic polymers can be obtained without a decrease in the productivity, and the molded products made therefrom exhibit significantly improved haze and impact resistance in comparison with the conventional products, as stated above.

Therefore, styrenic polymers according to the present invention will be used as a molding material in the fields of various different household goods, electric appliances and the like.

The present invention will now be described in greater detail referring to the following examples and comparative examples. In examples and comparative examples, all of % and ppm are based on weight.

Furthermore, weight average molecular weight and number average molecular weight of obtained styrenic polymers and impact resistance and the degree of haze of molded products are respectively obtained by measurement in the following way. The results of said measurements are shown in Table 1.

MEASUREMENT OF MOLECULAR WEIGHT

The measurement was conducted according to gel permeation chromatography (GPC) using ALC/GPC (150-C model) supplied by Waters Company and the columns for GPC (TSK-GEL GMH6 and TSK-GEL HM) supplied by Toyo Soda Co., Ltd.

IMPACT RESISTANCE

Impact resistance was measured with an Izod type impact tester using test pieces without notch as directed in JISK7110.

DEGREE OF HAZE

The degree of haze was measured as directed in JISK7105 (Measurement of Haze).

EXAMPLE 1

Styrene dissolving 400 ppm of 2,2-bis(4,4-ditertiarybutylperoxycyclohexyl) propane (Perkadox 12 brand: supplied by Kayaku Akuzo Corporation) was fed at a rate of 12.5 liter/hr into a continuous bulk polymerization system consisting of 1 unit of full mixing vessel type reactor having 23 liter capacity, 2 units of column type reactor having 33 liter capacity and 2 units of devolatilizing equipment which were connected in series. 3 units of reactors were maintained at the temperatures of 110° C./110° C./120° C. The conversion of styrene was found to be 75.2% at the outlet of the 3rd reactor. After residual styrene was removed by devolatilizing equipment, polymers were pelletized. The obtained pellets were found to have weight average molecular weight Mw of $45.2 \times 10^4$ and a Mw/Mn ratio of 2.64.

The pellets were subjected to injection molding of 3 mm thick plates to prepare test pieces without notch, and then impact resistance on the Izod type tester was measured by the use of the obtained test pieces. The degree of haze was measured as well. The results thereof are shown in Table 1.

EXAMPLES 2 to 5

The polymerization was carried out in the same procedure as in Example 1, except that the amount of 2,2-bis(4,4-diter tiarybutylperoxy-cyclohexyl) propane, the feed of styrene and the reaction temperatures were changed. The results are shown in Table 1.

COMPARATIVE EXAMPLE 1

The polymerization was carried out in the same procedure as in Example 1, except that 2,2-bis(4,4-ditertiarybutylperoxy-cyclohexyl) propane was not used and that styrene was fed in a different amount. The results are shown in Table 1.

COMPARATIVE EXAMPLE 2

The polymerization was carried out in the same procedure as in Example 1, except that 2,2-bis(4,4-ditertiarybutylperoxy-cyclohexyl) propane was incorporated in an amount of 700 ppm. The results are shown in Table 1.

COMPARATIVE EXAMPLE 3

The polymerization was carried out in the same procedure as in Example 1, except that 3 units of the reactors were maintained at the temperatures of 90° C./110° C./150° C. The results are shown in Table 1.

COMPARATIVE EXAMPLE 4

The polymerization was carried out in the same procedure as in Example 1, except that 3 units of the reactors were maintained at the temperatures of 80° C./80° C./90° C. and that styrene was fed at a rate of 4.0 liter/hr. The results are shown in Table 1.

COMPARATIVE EXAMPLE 5

The polymerization was carried out in the same procedure as in Example 1, except that 2,2-bis(4,4-ditertiarybutylperoxy-cyclohexyl) propane used therein was replaced by 1,1-bis(tertiarybutyl-peroxy)-3,3,5-trimethylcyclohexane (Perhexa 3M brand; supplied by Japan Oils and Fats Co., Ltd.). The results are shown in Table 1.

COMPARATIVE EXAMPLE 6

The polymerization was carried out in the same procedure as in Example 1, except that 2,2-bis(4,4-ditertiarybutylperoxy-cyclohexyl) propane used therein was replaced by benzoyl peroxide. The results are shown in Table 1.

TABLE 1-1

| | Amount of peroxide (wt ppm) | Feed of styrene (liter/hr) | Reaction Temperatures | | | Ratio of conversion 3rd reactor (wt %) |
|---|---|---|---|---|---|---|
| | | | 1st reactor (°C.) | 2nd reactor (°C.) | 3rd reactor (°C.) | |
| Exam. 1 | 400 | 12.5 | 110 | 110 | 120 | 75.2 |
| Exam. 2 | 400 | 18.8 | 110 | 110 | 120 | 56.4 |
| Exam. 3 | 200 | 15.0 | 110 | 110 | 120 | 52.1 |
| Exam. 4 | 100 | 13.3 | 110 | 110 | 120 | 43.5 |
| Exam. 5 | 400 | 8.0 | 100 | 100 | 110 | 64.5 |
| Com. Exam. 1 | 0 | 8.0 | 110 | 110 | 120 | 54.2 |
| Com. Exam. 2 | 700 | 15.0 | 110 | 110 | 120 | 75.7 |
| Com. Exam. 3 | 400 | 12.5 | 90 | 110 | 150 | 73.7 |
| Com. Exam. 4 | 400 | 4.0 | 80 | 80 | 90 | 41.0 |
| Com. Exam. 5 | 400*1 | 12.5 | 110 | 110 | 120 | 70.6 |
| Com. Exam. 6 | 400*2 | 12.5 | 110 | 110 | 120 | 40.5 |

TABLE 1-2

| | r*3 | 75-3 xr (−) | Outlet of 3rd reactor Mwo (× 10⁴) | Pellets Mw (× 10⁴) |
|---|---|---|---|---|
| Exam. 1 | 10.6 | 43.2 | 58.3 | 45.2 |
| Exam. 2 | 11.9 | 39.3 | 52.6 | 39.0 |
| Exam. 3 | 8.8 | 48.6 | 56.6 | 40.3 |
| Exam. 4 | 7.4 | 52.8 | 54.1 | 38.1 |
| Exam. 5 | 5.8 | 57.6 | 69.5 | 54.6 |
| Com. Exam. 1 | 4.9 | 60.3 | 43.9 | 31.5 |
| Com. Exam. 2 | 12.8 | 36.6 | 44.3 | 29.0 |
| Com. Exam. 3 | 10.4 | 43.8 | 50.7 | 36.9 |
| Com. Exam. 4 | 1.8 | 69.6 | 88.3 | 73.3 |
| Com. Exam. 5 | 9.9 | 45.3 | 38.0 | 30.4 |
| Com. Exam. 6 | 3.2 | 65.4 | 31.4 | 24.5 |

TABLE 1-3

| | Pellets Mw/Mn | Izod Impact Resistance (kg · cm/cm) | Degree of Haze (%) |
|---|---|---|---|
| Exam. 1 | 2.64 | 16.3 | 1.6 |
| Exam. 2 | 2.52 | 15.0 | 1.0 |
| Exam. 3 | 2.51 | 15.5 | 0.9 |
| Exam. 4 | 2.56 | 13.9 | 0.8 |
| Exam. 5 | 2.65 | 17.2 | 1.7 |
| Com. Exam. 1 | 2.30 | 10.2 | 1.2 |
| Com. Exam. 2 | 2.70 | 9.5 | 1.7 |
| Com. Exam. 3 | 3.39 | 13.7 | 4.7 |
| Com. Exam. 4 | 2.52 | 16.0 | 7.0 |
| Com. | 2.35 | 10.7 | 1.3 |

TABLE 1-3-continued

|  | Pellets Mw/Mn | Izod Impact Resistance (kg · cm/cm) | Degree of Haze (%) |
|---|---|---|---|
| Exam. 5 Com. Exam. 6 | 2.32 | 8.5 | 1.6 |

*1: 1,1-bis(tertiarybutylperoxy) 3,3,5-trimethylcyclohexane
*2: Benzoyl peroxide
*3: Reaction rate (wt %/hour)

What is claimed is:

1. A process for producing a styrenic polymer which comprises feeding a compound consisting essentially of a styrenic monomer to 2 to 6 units of reactors connected in series and carrying out a bulk polymerization at a reaction temperature of 90° to 200° C. and a difference of reaction temperatures among the units of reactors of not more than 40° C. and in the presence of 10 to 450 ppm by weight of an organic peroxide represented by the following formula (I):

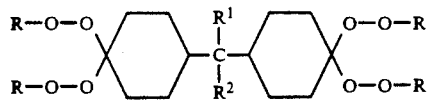

(I)

wherein R represents a tertiary alkyl group or a tertiary aralkyl group, and $R^1$ and $R^2$ each represent an alkyl group having 1 to 2 carbon atoms, said styrenic polymer having a weight average molecular weight of $30 \times 10^4$ to $70 \times 10^4$ and a ratio of weight average molecular weight (Mw) to number average molecular weight (Mn) of not more than 3.0.

2. The process according to claim 1 wherein, a reaction rate r of the continuous bulk polymerization is 5 to 15% hour.

3. The process according to claim 1, wherein the organic peroxide is at least one peroxide selected from the group consisting of 2,2-bis(4,4-ditertiarybutylperoxycyclohexyl)propane, 2,2-bis(4,4-ditertiaryamylperoxycyclohexyl)propane, 2,2-bis(4,4-dicumyl-peroxycyclohexyl)propane, and 2,2-bis(4,4-ditertiary-butylperoxycyclohexyl)butane.

4. The process according to claim 1, wherein the organic peroxide is 2,2-bis(4,4-ditertiary-butylperoxycyclohexyl)propane.

5. The process according to claim 1, wherein the weight average molecular weight of the styrenic polymer is $30 \times 10^4$ to $60 \times 10^4$.

6. The process according to claim 1, wherein the ratio of weight average molecular weight (Mw) to number average molecular weight (Mn) is 2.0 to 3.0.

7. The process according to claim 1, wherein a conversion of a styrenic monomer at the last reactor is 40 to 90% by weight.

8. The process according to claim 1, wherein the styrenic polymers discharged out of the last reactor are fed into a monomer devolatilizing equipment.

9. The process according to claim 1, wherein the styrenic monomer is selected from the group consisting of unsubstituted styrene, α-methylstyrene, α-ethylstyrene, α-isopropylstyrene, p-methylstyrene, m-methylstyrene, 2,5-dimethylstyrene, p-chlorostyrene, p-bromostyrene, dibromostyrene and mixtures thereof.

10. The process according to claim 9, wherein the styrenic polymer has a weight average molecular weight of $30 \times 10^4$ to $60 \times 10^4$ and a ratio of weight average molecular weight to number average molecular weight of 2.0 to 3.0.

11. The process according to claim 10, wherein the organic peroxide is selected from the group consisting of 2,2-bis(4,4-ditertiarybutylperoxycyclohexyl) propane; 2,2-bis(4,4-ditertiaryamylperoxycyclohexyl) propane; 2,2-bis(4,4-dicumylperoxycyclohexyl) propane; and 2,2-bis(4,4-ditertiarybutylperoxycyclohexyl) butane.

12. The process of claim 11, wherein the organic peroxide is 2,2-bis(4,4-ditertiary-butylperoxycyclohexyl) propane; the polymerization is a continuous bulk polymerization at a reaction rate of 5 to 15%/hour and the styrenic monomer at the last reactor is present in an amount 40 to 90% by weight.

13. The process of claim 12, wherein the styrenic polymer discharged out of the last reactor is fed into a thin film evaporator or a flush drum, operated at 180° C. to 300° C. and 1 to 600 torr; and residual monomers are discharged out of the evaporator or flush drum in an amount of not more than 500 ppm.

14. The process of claim 13, wherein the styrenic polymer is polystyrene.

* * * * *